Dec. 31, 1968          A. L. KOCHER ET AL          3,418,774
             BUILDING BLOCK AND WALL MADE THEREFROM
Filed Jan. 6, 1967                                Sheet 1 of 4
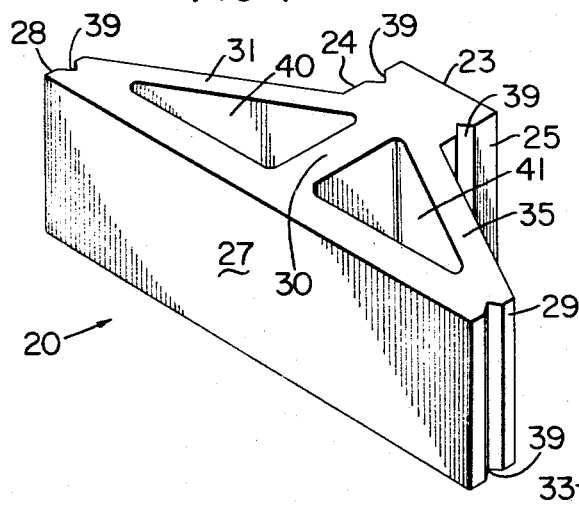
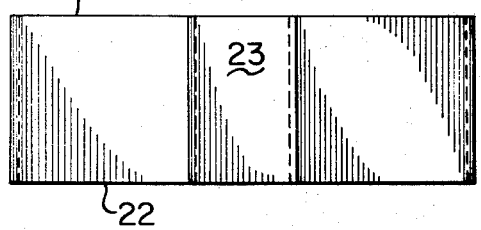
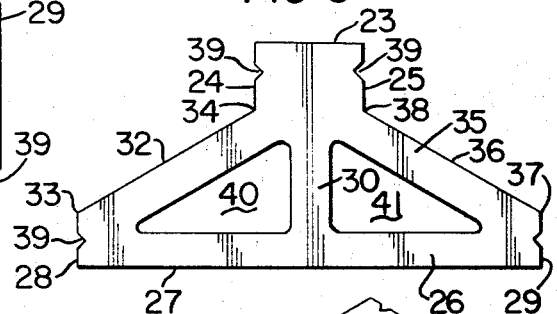
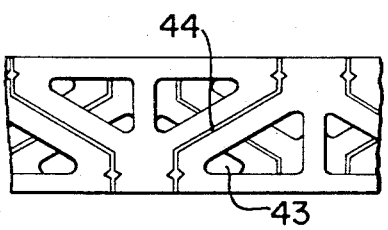
INVENTORS
ALFRED LAWRENCE KOCHER
ERNEST A. WIEDEMANN
BY
Auzville Jackson Jr.
THEIR ATTORNEY

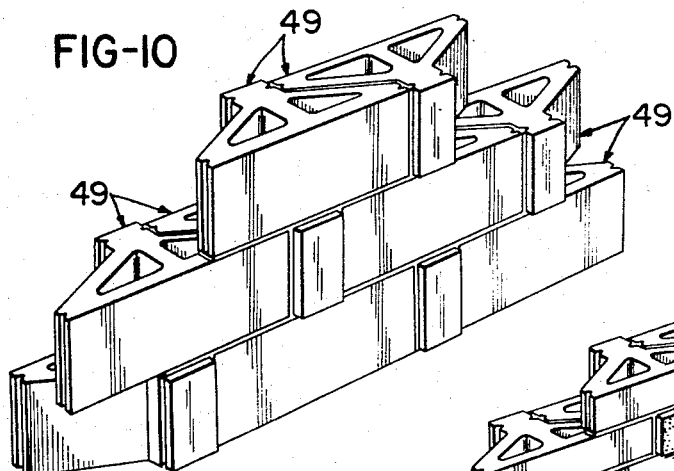
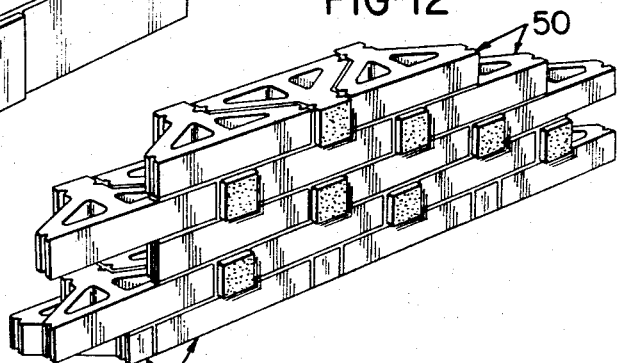
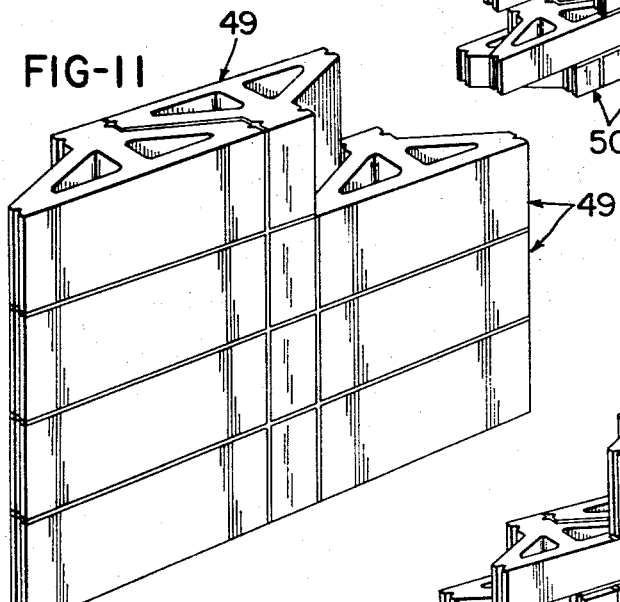
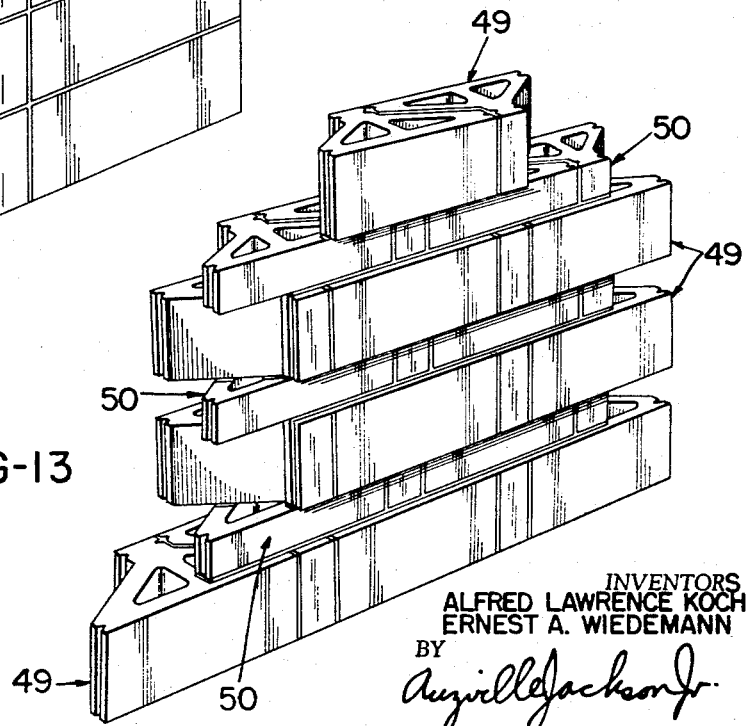

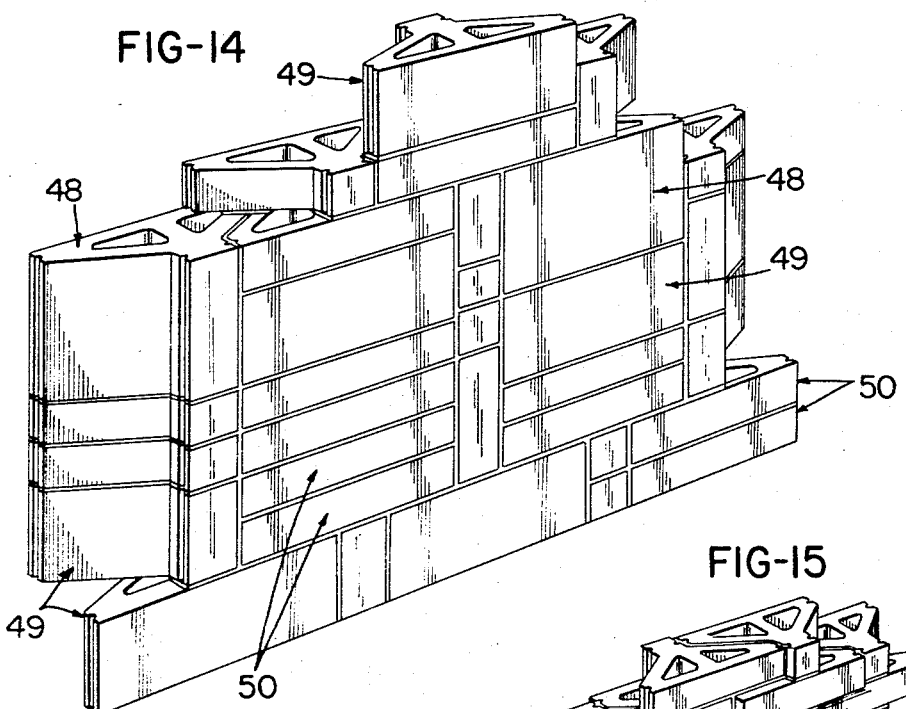
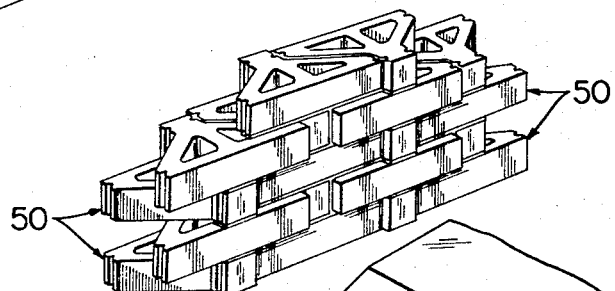
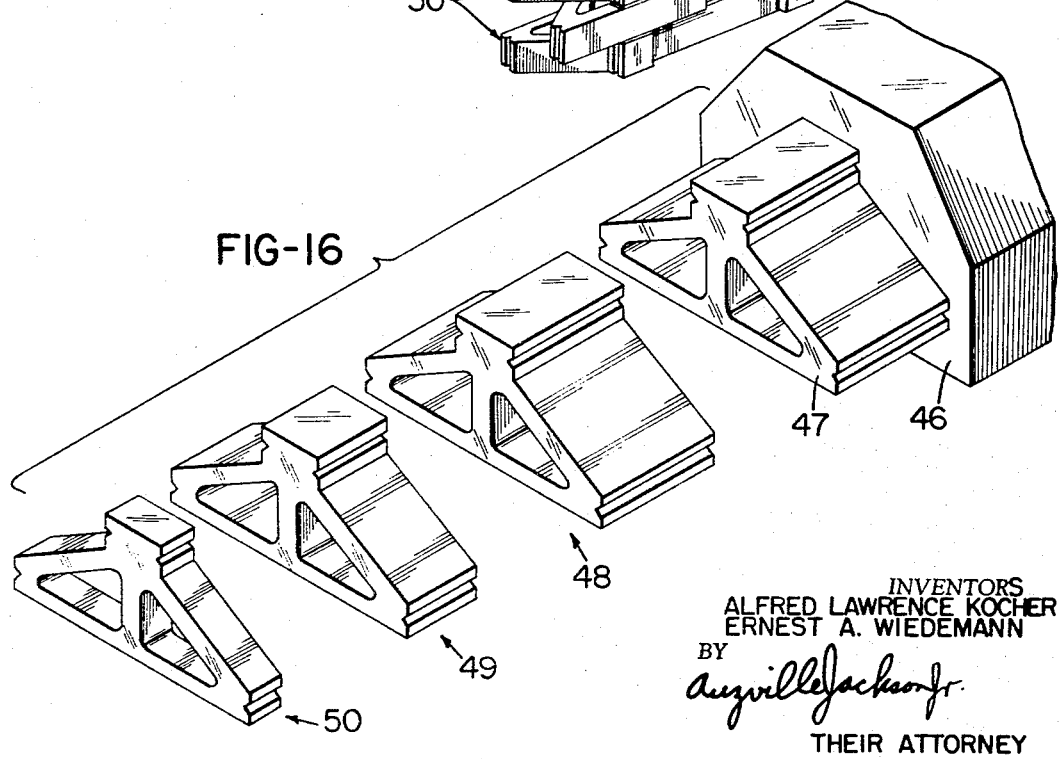

United States Patent Office 3,418,774
Patented Dec. 31, 1968

3,418,774
BUILDING BLOCK AND WALL
MADE THEREFROM
Alfred Lawrence Kocher, 314 Burns Lane, Williamsburg,
Va. 23185, and Ernest A. Wiedemann, 3215 Noble
Ave., Richmond, Va. 23222
Filed Jan. 6, 1967, Ser. No. 607,730
6 Claims. (Cl. 52—437)

ABSTRACT OF THE DISCLOSURE

This disclosure relates to a building block having both a header and a stretcher wall with the stretcher wall spaced from the header by two diagonal struts and one center strut or a solid section equivalent thereto. A wall made from the block as compared to the usual block has greater strength, much greater aesthetic appeal with many possible variations in wall appearance and much greater resistance to the passage of a driven rain or wind. The block is readily made and transported using present methods and is readily handled by the mason in placing it in a wall.

---

This invention relates to a practical and economical building block and wall made therefrom having improved strength, resistance to the elements, and a rich variety of possible patterns or bonds having great aesthetic appeal. The block is readily made and transported by existing techniques and is easily handled and laid on the job by the mason.

At the present time, hollow concrete building blocks are used in great quantity in the construction industry. The blocks mostly used have a nominal dimension of 16 inches in length, 8 inches in height and 8 inches in width and are usually laid in a wall in an "ashlar" pattern so that the length of the block is running parallel to the face of the wall. While the existing blocks have proved to be quite practical, they suffer from a number of limitations. Primarily, they lack lateral strength as witnessed by the fact that a number of these walls are blown over by high winds during construction. Furthermore, the walls are quite subject to leakage of a driven rain and wind through cracks at the mortar joints which result from exposure and settling. These cracks usually penetrate straight through the wall and thus permit ready passage of the rain and wind. Furthermore, these blocks are usually quite devoid of aesthetic appeal and offer only a limited variety of possible patterns or bonds.

Therefore, the need has existed for an improved building block and wall made therefrom which is preferably composed of concrete but may also be composed of other building materials such as clay, vitrified brick and the like which, when laid in an outer wall, partition or foundation, has greater strength, especially increased resistance to wind and other lateral pressure, is water and wind tight when exposed to a driven rain and wind, is less subject to mortar joint cracks resulting from settling and exposure to the elements such as hot sunshine and freezing weather, is capable of being insulated and would be pleasing in appearance with the possibility of a rich variety of different patterns or bonds.

However, it is critically important that in meeting these objectives the paramount virtues of the usual concrete blocks are not lost. The virtues of the usual concrete blocks are their practical and economical manufacture, their abiilty to be transported and handled readily and satisfactorily and their ability to be readily laid on the job by the mason.

The block of the present invention and the wall made from the block meets all of these objectives. While others have tried to achieve some of the above objectives, such attempts were made at a sacrifice of some of the other objectives. That none of the objectives had to be sacrificed in the present invention is due primarily to the unique shape of the block which has a stretcher wall on one side and a header on the opposite side connected together by two diagonal struts and one center strut which converge towards the header. Both the header and stretcher wall have mortar or adhesive receiving surfaces on each side which are normal to the length of the block and thus all parallel to one another. A vertical V-shaped depression is preferably provided in each adhesive receiving surface. The adhesive receiving surfaces adjacent the header are preferably of a different width than those adjacent the stretcher, and the outer face of the diagonal struts are provided with an insulating layer of closed cell plastic foam insulation such as polyurethane.

When the block just described is laid in a Flemish bond, these diagonal struts from layer to layer will cross one another, as viewed from an overhead position, to form a wall of increased strength using a minimum of materials and thus provides an enhanced resistance to various loads and especially wind loads and the like which are of a lateral nature.

The provision of the header on one side and the stretcher wall on the other of the same block inherently requires that the mortar joints on one side of the wall be staggered relative to the joints on the opposite side. Therefore, even if a crack developed in the joint, it would not penetrate directly through the wall since it would be blocked by the diagonal strut. This greatly enhances the ability of the wall to resist penetration by a driven rain or wind. Also, the V-shaped depressions provided in the vertical mortar or other adhesive receiving surfaces receive additional mortar which is enclosed and protected from the sun and air so that it will harden in a wall that is free from the edge crevices or cracks that usually occur when the application of mortar is restricted to the conventional edge-to-edge application.

In addition to the center strut enchancing the stiffness and strength of the block, it is located at a central balance point to provide a balanced handhold for the mason which permits the block to be readily handled with one hand when applying the mortar to the adhesive receiving surfaces and tapping it into place in the wall.

While inherently providing staggered joints, the provision of both a header and stretcher face on opposite sides of each block also permits it to be laid with each block interlocking with the adjoining block in a manner to provide an appearance of almost limitless variety and an interesting texture with outstanding aesthetic appeal.

The provision of the vertical adhesive receiving surfaces all being parallel and with the stretcher adhesive receiving surfaces being of a width less than the width of the header adhesive receiving surfaces permits the same blocks to either be laid in a flush wall with the faces of all the blocks in the same plane on opposite sides of the wall, or the faces can be selectively projected or telescoped to provide interesting patterns while still maintaining the other valuable features of the invention.

The plane outer faces of the diagonal struts readily lend themselves to the application of an insulation layer. Preferably, because of its outstanding insulating and other physical properties, closed cell polyurethane foam is applied by spraying a suitable mixture onto the surface.

The header and stretcher faces can either be left plain or be presented with a variety of special surfaces such as different colors or textures resulting from the choice of aggregate and cement; different surface configurations such as striations, one or more convex or concave indentations, and so forth resulting from the shape of the mold or die used in the manufacturing process; and the placing of special coverings or other devices upon the surface. Under any of these conditions the wall made from the block would have a finished and acceptable appearance on both sides and thus highly economical regarding its in-place cost.

Since the block is simple and compact with the absence of complex and sharp edges, it readily lends itself to be manufactured on existing equipment using well-known techniques. Furthermore, it can be readily stacked and transported without any special care over and above that needed by the usual block.

In some cases, the block would be solid rather than hollow especially when the block takes the form of bricks made from clay. In those instances the spaces between the two diagonal struts and center strut would be solid and would appear as a truncated isosceles triangle.

For a fuller appreciation of the nature and advantages of the present invention, reference should be had to the following detailed description taken in conjunction with the accompanying drawings in which like reference numerals designate like parts throughout the figures thereof and wherein:

FIGURE 1 is a view in perspective showing a building block constructed in accordance with one embodiment of the invention;

FIGURE 2 is an elevation view from the back of the block of FIGURE 1;

FIGURE 3 is a plan view of the block of FIGURE 1;

FIGURE 4 is a view in perspective of a wall constructed with a building block similar to FIGURE 1 in a Flemish bond or pattern;

FIGURE 5 is a plan view of a section of the wall laid in the manner of FIGURE 4;

FIGURE 10 is a view in perspective of a wall laid in a Flemish bond but having the header faces projecting beyond the stretcher faces;

FIGURE 11 is a view in perspective of a wall laid in a stack bond or pattern;

FIGURE 12 is a view in perspective of a wall using thinner blocks laid in a Flemish bond with the header faces projecting beyond the stretcher faces and being of a different surface appearance;

FIGURE 13 is a view in perspective similar to FIGURE 7 except the thicker blocks are only approximately twice as thick as the thinner blocks;

FIGURE 14 is a view in perspective of a wall made from blocks of three varying thicknesses laid at random but having the same cross-sectional configuration;

FIGURE 15 is a perspective view of a wall laid from relatively thin blocks with the header and stretcher faces alternately projecting in a manner to form a series of stacked crosses;

FIGURE 16 is a schematic view in perspective of the block being constructed by the extrusion process and cut into varying heights.

Figure 6:
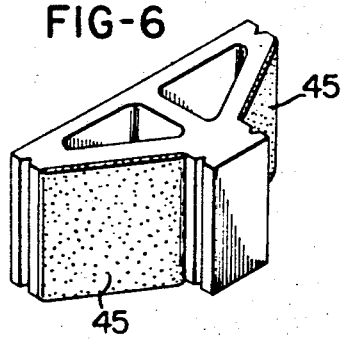
FIGURE 6 is a view in perspective of another embodiment of the block of this invention with insulation applied to selected areas thereof.

With reference to FIGURE 1 which is a perspective view, FIGURE 2 which is an elevation view looking from the back side of FIGURE 1 and FIGURE 3 which is a plan view of FIGURE 1, there is shown a building block 20 constructed in accordance with one embodiment of the invention. Such block may be composed of concrete or other cementitious material, vitrified brick, clay or other suitable, available and acceptable materials. The block has a top surface 21, a bottom surface 22 substantially parallel to the top surface and is surrounded by eight additional surfaces or faces. These eight other faces or surfaces are a vertical header 23, which has an outer header face whose outline is of rectangular shape extending from the top surface to the bottom surface. The header is bound on both sides by a first header mortar or other adhesive receiving surface 24 and on the opposite side by a second mortar or other adhesive receiving surface 25. Although mortar is a preferred adhesive, any other suitable or acceptable adhesive would do as well. On the opposite side of the block from the header surface, is the stretcher wall 26 which has an outer stretcher face 27 whose outline is of rectangular shape which is substantially parallel to the outline of said header face and extends vertically between the bottom and top surfaces. The stretcher wall is to be noted as being between about 200% to about 700% wider than the header. The terms header and stretcher are words from the masonry art and refer to a building block laid with its long face parallel to the face of the wall. This would be the appearance of the stretcher face of this invention when laid in a wall. The term header usually refers to a building block laid with its narrow end toward the face of the wall and in the present invention the header would give that appearance although, in fact, each block of the present invention contains both a header and a stretcher whose outlines are parallel to one another as is obvious from this description and the drawings.

The stretcher face is bound on each end by a mortar or other adhesive receiving surface. More specifically, there is provided a first stretcher adhesive receiving surface 28 on one side and a second stretcher adhesive receiving surface 29 on the opposite side. It will be noted that the stretcher adhesive receiving surfaces are perpendicular to the outline of the stretcher face and extend for a short distance inward. Likewise, the header adhesive receiving surfaces are perpendicular to the outline of the header face and extend a short distance in an inward direction. Therefore, it is to be noted that the stretcher and header adhesive receiving surfaces lie in parallel planes. It will be further noted that the width of the header adhesive receiving surfaces is substantially greater than the width of the stretcher adhesive receiving surfaces. The fact that these widths are different in cooperation with the fact that all of these adhesive receiving surfaces are parallel, permits the blocks to be placed in a wall in a manner to have varying amounts of projection or telescoping of the surfaces of one block past an adjacent block to create a rich variety of contrasting surfaces making the wall aesthetically attractive and acceptable without any additional covering.

Although the building block shown in the figures has a planar stretcher face and header face, the block readily lends itself for nonplanar treatment. For example, the block can have a series of striations, one or more convex or concave indentations, or other surface configurations placed therein during the molding or extruding operation or subsequent to the molding or extruding operation. Still further, if it is desired to form a circular wall, such can be readily done by using two different blocks of this invention. The first block would have a concave header and a convex stretcher and the second block would have a convex header and a concave stretcher. The concavity and convexity would be of circular form having a radius conforming to the radius desired for the wall. Therefore, when the terms "width" or "height" or "thickness" are used relative to the header and stretcher faces, the plane bounded by the outline of the two sides and top and bottom surfaces is what is being referred to. While this plane coincides with the face of the header and stretcher when such faces are flat or planar as shown in the drawings, such would not necessarily be the case when the faces are not flat.

The block has a converging means preferably in the shape of a truncated isosceles triangle connecting the stretcher to the header. As shown in FIGURES 1, 2 and 3 the converging means is made preferably of three struts. More specifically, the block has a center strut dividing wall 30 running between the stretcher wall and the header. In addition to the function of serving as a structurally strong and stiff spacing means tying the header to the stretcher wall, the center strut forms an excellent balanced hand hold by which the mason can lift the block in order to butter the surfaces with mortar and subsequently guide and tap it into place in the wall. The block additionally has two diagonal strut walls connecting the header and stretcher wall. The first diagonal strut 31 has an outer face 32 extending from the innermost edge 33 of the first stretcher adhesive receiving surface to the innermost edge 34 of the first header adhesive receiving surface.

Likewise, the second diagonal strut 35 has an outer face 36 extending from the innermost edge 37 of the second stretcher adhesive receiving surface to the innermost edge of the second header adhesive receiving surface. If the plane of the diagonal struts is extended outwardly until it intersects an extension of the stretcher face, they will define an included angle. This angle will vary from between 25° and 65° in the block shown by this invention.

Also, the included angle of convergence between the outer faces of the diagonal struts or converging means as they converge towards the header is between 50° and 130°. It is to be noted that the thickness of the center strut and two diagonal struts is approximately the same. In some cases, especially when the block is made of clay in the form of a brick, the converging means will preferably be solid rather than hollow as shown.

It is apparent from an examination of FIGURE 3 that the thickness of the block as measured from the plane bounded by the outline of the header face to the plane bounded by the outline of the stretcher face is composed of the width of the header adhesive receiving surfaces, the width of the stretcher adhesive receiving surfaces and the distance or thickness between the inner edges of the header adhesive receiving surfaces and the inner edges of the stretcher adhesive receiving surfaces. This latter distance or thickness is measured along a line running between and perpendicular to the planes of the outer faces of the header and stretcher and is a substantial portion of the overall thickness of the block. Preferably this thickness is substantially greater than either the width of the stretcher adhesive receiving surface or the width of the header adhesive receiving surfaces and is always greater than the lesser of these two widths. Also, the over all thickness of the block as measured in a horizontal direction is preferably between about 100% to about 700% the width of the header face.

While the height or vertical thickness of the block can be quite long, it is preferable that the width of the outer stretcher face be greater than the height of the block and height of the outer stretcher face.

On each of the four adhesive receiving surfaces is preferably a V-shaped groove 39 running from the top and bottom in which the mortar, upon hardening, will form a key to lock the blocks together. Also, the mortar in these grooves it protected when setting up so that problems resulting from exposure to the sun, drying winds, freezing and the like are minimized. Thus the hairline cracks often associated with ordinary mortar joints is avoided.

As one prefered set of dimensions for a block as shown in FIGURE 1, the header is 3¼ inches wide, the stretcher face is 15¼ inches wide, the thickness of the block as measured from the stretcher face to the header face is 7½ inches, the height is 5¾ inches, both stretcher adhesive receiving surfaces are 1½ inches wide and both header adhesive receiving surfaces are 2¼ inches wide. A block of this height will be referred to sometimes herein as a "medium" block.

The thickness of the center strut and the two diagonal struts is approximately one inch and the thickness of the stretcher wall is one inch, although it may be thickened to 1¼ inches to meet the requirements of cerain industry standards. The acute angle made by the plane of the diagonal struts with the stretcher face is approximately 30°. Thus the angle of convergence is approximately 60°.

The block of FIGURE 1 is also provided in a short height of 2¾ inches which is approximately half the height of the medium block. Still further, the block is provided in a tall height of 8¾ inches which is approximately one and one-half times the height of the medium block. Blocks of these dimensions would preferably be used with a ¼ inch thick mortar joint, although joints of other thicknesses could be utilized.

As seen in FIGURES 1 and 3, there is a first core 40 defined by the inner face of the first diagonal strut which is substantially parallel to the outer face, the center strut and the stretcher wall and a second core 41 defined by the inner face of the second diagonal strut which is substantially parallel to the outer face, the center strut and the stretcher wall.

In FIGURE 4 there is shown a wall made from the blocks similar to the type shown in FIGURE 1 and laid in a Flemish bond. The Flemish bond is one in which a stretcher face alternates with a header in the same row and on the adjacent row above and below the center of the stretcher face coincides with the center of the header face. The blocks are held together with any suitable cementitious or adhesive material but preferably a mortar made by mixing lime, cement, or the like with sand and water.

A plan view of a wall like that of FIGURE 4 is shown on FIGURE 5.

In laying a wall such as shown in FIGURES 4 and 5, traditional masonry techniques are used wherein the top surface of the foundation or underlying block is buttered preferably with motar (although other adhesive or cementitious materials may be used) along the top of the stretcher wall and along the top of the header. The new block is buttered along one stretcher adhesive receiving surface and one header adhesive receiving surface and then tapped gently into place adjacent a previously laid block. Although it is not shown in the drawings, the cementitious material holding the blocks together would not normally be applied to the outer diagonal faces 32 and 36.

When the block encounters the angle of a building or the side of a door or window opening, use is made of what are termed "starter bricks" or "starter blocks." These are special bricks or blocks which are often used at angles, building corners, window jams, and are of a length that places a header precisely at the center of the stretcher face that occurs directly above or below. Obviously, the block as shown in the drawings will occasionally require cutting and placing with mortar in order to fit a fixed dimension just as the usual block has to be cut and placed in past practice.

It is to be noted from FIGURES 4 and 5 that the block is quite economical since a finished and acceptable surface is exposed to both the front and the rear. As seen best in FIGURE 5, the diagonal struts of two blocks of one layer cross and form an intersection 44 with the diagonal struts of two blocks of the layer just below. The acute angle of the crossing or intersection is about 60° as shown in FIGURE 5 and is preferably never less than 50° which makes for a very stable and structurally strong wall. In this repeated alternation of diagonal bracing struts at acute angles to one another of not less than 50°, there is set up within the wall a truss effect and an interlocking of supporting forces. Also, the bonding arrangement of the header of the unit on one side and the stretcher on the other side further contributes to the strength and is an inherent part of the truss and interlocking effect. It is to be noted that cores of one row overlap the cores of adjacent row to provide a vertically continuous core or passageway 43 between a plurality of rows. This passageway can be quite useful in running utilities and the like inside the wall.

The broken direction of the diagonal struts and the alteration vertical joints on one side of the wall relative to the other side forms a labyrinthian barrier against moisture and wind penetration through the well even in those cases where the mortar slightly pulls away from the adhesive receiving surface of the block. As the moisture or wind is driven through the crack, it first encounters the diagonal which would shunt it away from further penetration. This, therefore, offers outstanding resistance of a kind not enjoyed by present blocks in a single thickness wall. Still further, the wall is less subject to mortar joint leakage because the joint when setting up is less subject to drying out. When a wall is laid in the sunshine, if the motar dries too quickly, it leaves a little craze line along the side of the joint which is a very definite weakness. With the grooves in the present block, the mortar wipes into these joints and dries more slowly under partial protection to give a better keying of the mortar to the block.

In FIGURE 6 is shown a block in perspective in which the outer face of each diagonal strut is sprayed with an insulating layer 45 of a closed-cell foam plastic such as polyurethane which has outstanding insulating and other properties. The layer is preferably applied to a thickness of 3/16 inch over the entire face from the top to the bottom surfaces. Other suitable insulating materials and thicknesses can be utilized and the material can be applied in sheet form utilizing a suitable adhesive rather than the preferred spray-on method of application. As is readily visualized when the block of FIGURE 6 is laid into a wall, it will mate with the insulating layer of an adjacent block to form a double layer and thus contribute outstanding insulation and other weather-resistant characteristics to the wall made therefrom.

In some cases, in order to accommodate a layer of insulation or to provide an increased air-gap or the like, the outer faces of the diagonal strut may be recessed a sufficient amount to let the free projecting portion of the header and the associated header adhesive receiving surfaces to project an increased amount so that when a wall is formed from the block the degree of projecting or telescoping of one block past another is sufficient to provide either a flush surface or a surface in which the header projects outwardly beyond the stretcher face. It can be seen that the amount of this projection is limited approximately by the distance from the edge or side of the outline of the header to the outer faces of the converging means. While this distance usually coincide approximately with the width of the header adhesive receiving surface, it would not necessarily be so since the width of the mortar joint and the amount, if any, the outer faces of the converging means are recessed must be taken into consideration. Preferably, this distance is always wider than the width of the stretcher adhesive receiving surface.

With reference to FIGURES 7–15, a number of walls are shown which serve to illustrate the almost limitless variety of different and attractive walls which can be formed from the blocks of this invention which are identical except for three variations in height and varying surface appearance of the header as contrasted to the stretcher.

Figure 7:
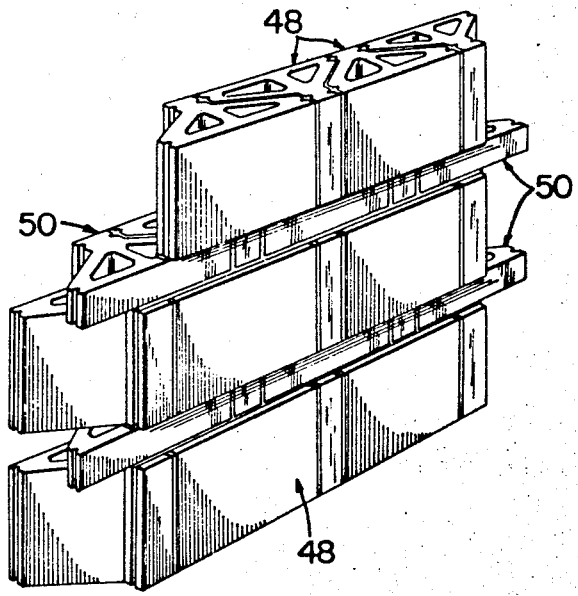
FIGURE 7 is a view in perspective of a wall showing the use of two blocks having different heights with the thinner block being recessed and only about one third the height relative to the thicker block.

More specifically, in FIGURE 7 is shown a bottom layer of tall blocks 48 laid in the typical manner. Above this is a second layer of short blocks 50 of the same shape except for being approximately ⅓ the height or vertical thickness of the bottom layer and overlapping in a modified Flemish bond but depressed into the wall a small distance to offer a surface contrast. The blocks as shown in FIGURE 7 are all made from the same material so there is no color contrast as shown. The third layer from the bottom is composed of blocks similar to the bottom layer. The fourth layer is similar to the second layer and then is succeeded, in turn, by alternate superposed layers to make up the entire wall.

Figure 8:
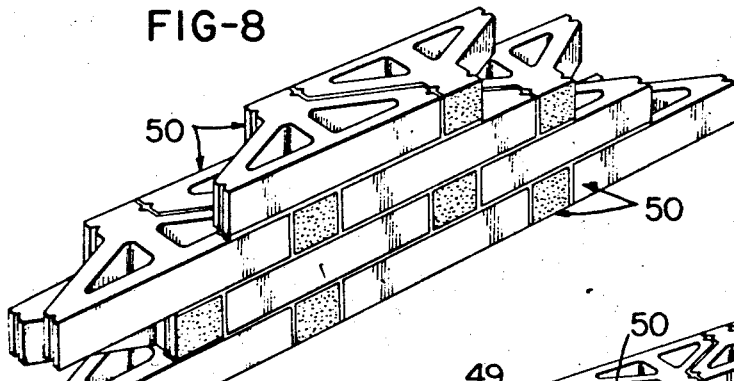
FIGURE 8 is a view in perspective of a wall using blocks with the header face having a different surface appearance than the stretcher face so as to provide a contrasting pattern.

In FIGURE 8 is shown a typical wall utilizing all short blocks 50 of identical size but of approximately half the height of the medium block. The header face is of a different surface appearance regarding color, texture or the like than the stretcher face so as to give a contrasting visual appearance to the wall even though the wall is otherwise of a standard Flemish bond. Such is especially attractive laid with brick in such a manner that brick stretcher faces would alternate with brick header faces of a different color.

Figure 9:
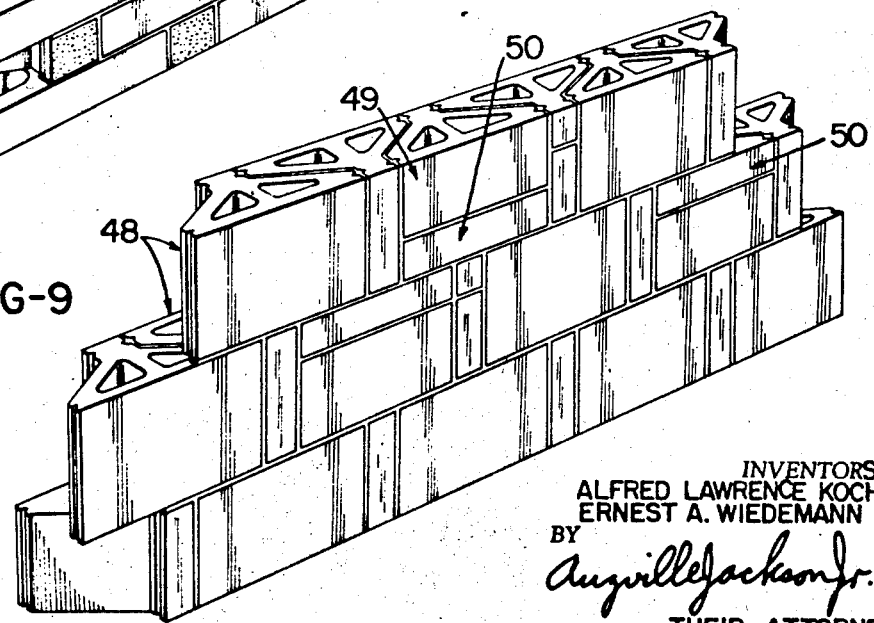
FIGURE 9 is a view in perspective showing a wall in which blocks of three different thicknesses are laid in a varying pattern.

In FIGURE 9 is shown a wall in which the bottom layer is composed of tall blocks 48 laid in the typical pattern which are approximately 50% taller than a medium block. This is succeeded by the second layer in which the same size tall block is the first block overlapping the bottom wall adjacent a similar size tall block 48 in which the header face is shown and is so far a repeat of typical Flemish pattern. However, rather than the same sized block being used in the next position, the stretcher face is that of a medium block upon which is stacked a block of approximately half the thickness of the medium block. This is succeeded in a direction running along the wall by the header faces of a medium size block and an overlying short block which lies adjacent another tall block which again is succeeded by the header face of a similar sized tall block. This, in turn, is succeeded by the stretcher face of a medium block superposed by the stretcher face of a short block 50. In turn, this is followed by the header face of a tall block 1½ times the height of a medium block. The third row follows an arrangement similar to the second row with short blocks 50, medium blocks 49 and tall blocks 48.

In FIGURE 10 is shown a wall made from medium blocks 49 laid in a modified Flemish bond but in which utilization is made of the advantages provided by the fact that all of the adhesive receiving surfaces are parallel and the header adhesive receiving surfaces are wider than the stretcher adhesive receiving surfaces. This permits a parallel movement of these adhesive receiving surfaces without the width of the mortar joint changing. Thus a projecting or telescoping of the header face beyond the stretcher face provides a wall having an interesting contrast as shown even though the blocks are identical. Of course all projecting or telescoping is done while the mortar or other cementitious material is still plastic since once it hardens no further telescoping or projecting can be accomplished.

FIGURE 11 shows a wall laid in a stack bond having a first row of medium size blocks with stretcher faces alternating with header faces. The superposed rows of medium blocks 49 thereabove all have similar blocks with the vertical joints falling on the vertical joints of the rows below. This wall is not as strong as a wall in which the joints are overlapped such as in the Flemish bond, but is an interesting variation and quite attractive when strength is not a prime consideration.

In FIGURE 12 is shown a modified Flemish bond made from short blocks 50 and medium blocks 49 in which the header faces project beyond the stretcher faces and are finished with a color or other surface treatment in a contrasting appearance to that of the surface of the stretcher faces. Since the short blocks are only approximately half-height, the header faces are almost square.

In FIGURE 13 is shown a perspective view of a wall made with a modified Flemish bond from medium blocks 49 with alternate rows of half-height short blocks 50 being recessed to provide still another variation to the appearance of the wall.

In FIGURE 14 is shown a perspective view of a wall which fits no particular bonding pattern but which may be referred to as a "random" bond. As can be seen, it is composed of blocks of three different heights, that is, the medium height 49 of about 5¾ inches, a short height 50 of about 2¾ inches and a 1½ or tall height 48 of about 8¾ inches. Otherwise, the blocks are identical in cross-sectional configuration and in surface appearance. The first row is made up serially of the stretcher face of a medium block, the header face of a medium block, the header faces of two stacked short blocks, and the stretcher faces of two stacked short blocks. The next row is made up serially from left to right of the header faces of a medium block, the stretcher faces of two stacked short blocks, the header face of a tall block which extends vertically up into the next row, the stretcher faces of two stacked short blocks, and the header face of a medium block. This random pattern is repeated in the remaining rows in a manner obvious from a study of FIGURE 14.

FIGURE 15 is another perspective view of a wall made up from short half-height blocks 50 and laid in a manner to provide rows of stacked crosses to give a quite unusual and attractive appearance. As is seen, all the blocks in the first row have the header faces projecting beyond the stretcher faces. In the second row the stretcher faces project beyond the header faces with the stretcher faces of the second row lying in the same plane as the header faces of the first row and the header faces of the second row lying in the same plane as the stretcher faces of the first row. In the third row, the header faces again project beyond the stretcher faces and such pattern is repeated on up the wall as shown in FIGURE 15. Other than for the projections this would be a standard Flemish bond and it may be called, for purposes of this invention, a stacked-cross Flemish bond.

FIGURE 16 shows a schematic rendering of one way the block can be readily manufactured from clay or concrete or other suitable material. There is shown a suitable extrusion 47 emerging from an extruding die 46 which is cut transversely into blocks of a medium height 49, a half-height or short height 50 and a 1½ or tall height 48. Thus there is shown the block is of a convenient shape for manufacture by this economical method. While the extrusion method for making clay bricks is known, it has not been used to any substantial degree to make concrete blocks composed of aggregate and sand bound together by a cementitious material, preferably portland cement. The aggregate is hard, inert stonelike particles such as broken stone, gravel, cinders, broken brick or mixtures of these materials. Sufficient water is added to the mixture to make it extrudable and to be available for the chemical reaction that occurs when the concrete hardens. The normally vertical surfaces of the finished block are formed by the extrusion die and the normally top and bottom surfaces are formed by the cutting device used to sever the block to a predetermined height from the extrusion.

Although the extrusion method lends itself readily to the manufacture of the blocks, a common method of making these blocks from concrete will be standard block-making machinery as in present widespread use for making the common and ordinary concrete block.

It is readily seen from the above description that the building block of the present invention combines a high strength-to-weight ratio, high resistance to the elements, and high aesthetic appeal, together with the important attributes of being readily manufactured in a practical manner, handled satisfactorily in shipping, and laid on the job by a mason conveniently. Also, the block can be normally handled and transported to the job using standard techniques since the block of this design can be easily stacked and palletized. The block can be faced for special uses with stone chips or with fractures of larger size, such as marble pieces or faced with still other materials to achieve brightness, color and self-cleaning surfaces. Still further, the choice of the color and texture of the sand, aggregate and cement can readily change the appearance of concrete block while the choice of clay and method of firing can readily vary the appearance of bricks made of clay. Striations and other surface configuration can be readily molded, embossed or extruded into the surface of the header and stretcher both during the principal forming operation or thereafter. Surface grooves on the header which are different from those on the stretcher can readily provide a contrasty wall even though the color is the same.

Another advantage of the block which should be stressed is its ability to provide "two-way facing" with both the inside and outside walls having finished faces. These faces require no plastering or painting and as exteriors for partitions and exposed walls are virtually self-cleaning and permanent.

It will be obvious to those skilled in the art that the block can be of varied dimensions as to its height, width, depth and width of adhesive receiving faces and the like and still be within the concept of the invention. Also the block can be rotated from its normal direction so as to form a pierced wall with the header faces and stretcher faces lying in horizontal or other planes rather than vertical planes. Thus, while certain embodiments of the invention have been illustrated and described and certain details pointed out, it is to be understood that these are capable of omission, variation and modification without departing from the spirit and scope of the invention; therefore, the invention is not limited to the precise details set forth, but only as indicated in the appended claims.

What is claimed is:

1. A building block (20) comprising: a top surface (21) and a bottom surface (22) substantially parallel to said top surface; a vertical header (23) having a header face extending vertically between said top surface and said bottom surface, and with its width extending between a first side and a second side; first (24) and second (25) header adhesive receiving surfaces adjoining respectively said first and second side with their widths being equal and extending in an inward direction substantially perpendicular to said header face; a vertical stretcher (26) having an outer stretcher face (27) spaced from said header face with its width being about 200% to about 700% the width of said header face and extending between a first side and a second side with its height being less than its width; first (28) and second (29) stretcher adhesive receiving surfaces adjoining respectively said first and second side of said stretcher face with their widths being equal and substantially less than the widths of said header adhesive receiving surfaces and extending in an inward direction substantially perpendicular to said stretcher face; a converging means connecting said stretcher to said header and composed of first (31) and second (35) diagonal struts of equal thickness having substantially flat outer faces (32, 36) and inner faces substantially parallel to said outer faces; said outer faces extending from the inner edges (34, 38) of said header adhesive receiving surfaces to the inner edges (33, 37) of said stretcher adhesive receiving surfaces; a vertically extending center strut (30) of substantially equal thickness to said diagonal struts and having one end adjoining said stretcher at the center thereof and having its opposite end adjoining said header; said first and second diagonal struts converging towards one another at an included angle between 50° and 130°; and the thickness of said block as measured between the inner edges of said header adhesive receiving surfaces being substantially greater than the width of the stretcher adhesive receiving surface.

2. A building block as set forth in claim 1 in which there is provided a vertical groove (39) in each of said four adhesive receiving surfaces.

3. A building block as set forth in claim 1 in which at least one of said converging means outer faces has a layer (45) of insulation adhered thereto.

4. A building block as set forth in claim 1 which is made from aggregate and sand bound together by a cementitious material with its vertical surfaces formed by the extrusion through a die and its top and bottom surfaces formed by being cut.

5. A wall made from a plurality of building blocks as set forth in claim 1 held together by a cementitious material in which at least one of the outer surfaces of the wall is composed of rows of the blocks having stretcher faces alternating with header faces with the midpoint of the width of the stretcher face in one row lying in the same plane as the midpoint of the width of the header face in the adjacent rows so as to have a broken joint pattern and a crossing of the converging means outer faces of one row with the converging means outer faces of adjacent rows at an acute angle of not less than 50°.

6. A wall as set forth in claim 5 in which the header faces in one row project a predetermined distance beyond the stretcher faces of that row and the stretcher faces of adjacent rows project the same predetermined distance beyond the header faces of said adjacent rows with all the projecting stretcher faces and projecting header faces lying in the same plane with said pattern being repeated to give a stacked-cross appearance to the wall.

References Cited

UNITED STATES PATENTS

| | | | |
|---|---|---|---|
| 212,243 | 2/1879 | Luke et al. | 52—611 |
| 398,939 | 3/1889 | Cadwell | 52—574 |

FOREIGN PATENTS

| | | |
|---|---|---|
| 63,803 | of 1914 | Austria. |
| 78,551 | 12/1954 | Denmark. |
| 592,876 | 5/1925 | France. |
| 1,083,223 | 6/1954 | France. |
| 227,111 | of 1910 | Germany. |
| 78,804 | 7/1951 | Norway. |
| 46,685 | 3/1920 | Sweden. |
| 47,917 | 11/1920 | Sweden. |
| 48,816 | 3/1921 | Sweden. |

FRANK L. ABBOTT, *Primary Examiner.*

JAMES L. RIDGILL, JR., *Assistant Examiner.*

U.S. Cl. X.R.

52—608, 561, 574